(12) United States Patent
Nakagawa

(10) Patent No.: US 7,272,019 B2
(45) Date of Patent: Sep. 18, 2007

(54) SWITCHING POWER SUPPLY APPARATUS

(75) Inventor: Shin Nakagawa, Tokyo (JP)

(73) Assignee: Fidelix Y.K., Tokyo (JP)

( * ) Notice: Subject to any disclaimer, the term of this patent is extended or adjusted under 35 U.S.C. 154(b) by 112 days.

(21) Appl. No.: 10/558,799

(22) PCT Filed: May 16, 2005

(86) PCT No.: PCT/JP2005/008872

§ 371 (c)(1),
(2), (4) Date: Nov. 29, 2005

(87) PCT Pub. No.: WO2005/112243

PCT Pub. Date: Nov. 24, 2005

(65) Prior Publication Data

US 2006/0250822 A1    Nov. 9, 2006

(30) Foreign Application Priority Data

May 17, 2004 (JP) ............................. 2004-146552

(51) Int. Cl.
*H02M 3/335* (2006.01)
(52) U.S. Cl. ............................. 363/16; 363/17; 363/26; 363/41
(58) Field of Classification Search .................. 363/16, 363/17, 22–26, 41, 49, 56.05, 56.11, 132
See application file for complete search history.

(56) References Cited

U.S. PATENT DOCUMENTS

| 6,115,271 A * | 9/2000 | Mo ........................... 363/56.11 |
| 6,118,673 A * | 9/2000 | Hua .......................... 363/56.11 |
| 6,169,668 B1 * | 1/2001 | Clayton ........................ 363/26 |

FOREIGN PATENT DOCUMENTS

| JP | 6 14251 A | 1/1994 |
| JP | 6 284719 A | 10/1994 |
| JP | 2000 166235 A | 7/2000 |
| JP | 2003 309981 A | 10/2003 |
| JP | 2003 533163 A | 11/2003 |

OTHER PUBLICATIONS

Microfilm of the specification and drawings annexed to the request of Japanese Utility Model Application No. 41946/1979 (Laid Open No. 142054/1980); Sanyo Electric Co., Ltd.; Oct. 11, 1980; Entire document; cited in International Search Report; Copy of document not provided.

* cited by examiner

*Primary Examiner*—Jessica Han
(74) *Attorney, Agent, or Firm*—Norris McLaughlin & Marcus PA

(57) ABSTRACT

To provide a switching power supply apparatus which can achieve the followings simultaneously in high levels: the voltage waveform capable of reducing switching noise to the least is in a sine-waveform; capable of providing an output of stable voltage without a control, and a simple response; and capable of corresponding to instantaneous peak current without having saturation of the core. It relates to an improvement of a resonance-type Royer converter with less switching noise as a base, which is directed to be used for audio equipment. A second inductor is inserted to the primary side inductor between a rectifier circuit and a smoothing means, which is coupled to the primary-side inductor in a same magnetic circuit in a direction of canceling a DC magnetic flux. Moreover, timing of the next cycle is determined by applying a center tap voltage of a transformer to a synchronous signal input terminal of a control IC. Thereby, a self-excited oscillating action is actually stabled. With this, high demands for use in audios can be satisfied simultaneously.

15 Claims, 3 Drawing Sheets

SWITCHING POWER SUPPLY APPARATUS

FIELD OF THE INVENTION

The present invention relates to power supply for reducing switching noise and, particularly, to a power supply apparatus suitable for audio equipments or lighting apparatuses. Moreover, the reduction of switching noise allows the decrease of electrical current leakage by reducing the value of the Y-capacitor, and thus the power supply apparatus is preferable for use in medical equipments.

DESCRIPTION OF THE RELATED ART

In the case of audio equipment or medical equipment where the switching noise is required to be low, conventionally used are following soft switching power supplies such as a PS power supply, an SMZ power supply, a partial resonance power supply, and a quasi resonance power supply. Further, a lighting apparatus of an inverter type often employs a resonance-type Royer converter system.

SUMMARY OF THE INVENTION

The resonance time of voltage resonances of the PS power supply, SMZ power supply and partial resonance power supply is partial so that the voltage waveform applied to a transformer takes the form of a trapezoid. The oblique part of the trapezoid is the voltage resonance time. Due to the reasons described later, this is insufficient since voltage resonance with a sine-wave voltage waveform is more preferable for use in audio equipments. These are of half-bridge structures. Thus, they can easily correspond advantageously to the AC230V area, however, switch-driving of high side is troublesome. Therefore, it is not preferable for consumer appliances in terms of cost. A quasi resonance converter when turned on is soft switching but is hard switching when turned off, so that it is insufficient in terms of noise reduction effect.

The resonance-type Royer converter has less switching noise so that it is very convenient for use in a lighting apparatus that does not have direct current output. However, self-exited oscillation by a bipolar transistor is mainly used, with which it is currently difficult to increase frequency due to element storage time. It is insufficient for use in audio equipments due to the reasons described later if the frequency cannot be increased.

MOSFET can be operated at a high speed, however, the gate is driven by a waveform similar to a sine wave in the case of self-oscillation, which is likely to cause a simultaneous-off period thus leading to an increase of the loss. Moreover, when MOSFET is self-exited oscillated, two switches may be set to ON simultaneously so that the switching elements themselves may be broken.

It is difficult with self-excited oscillation to have optimum timing with high frequency in both the bipolar transistor and the MOSFET. Further, when there is direct current output from the resonance-type Royer converter, a rush current to an output smoothing capacitor output is generated at the time the power is supplied. At this time, a problem is that the inductor on the primary side is likely to be saturated.

It is noted that the first requirement for audio equipment is to reduce the switching noise to the extreme. As will be described later, it is preferable for the switching frequency to be from 88 kHz to 150 kHz inclusive even if there is what. Based on the experiences, it is necessary to reduce particularly the high-frequency common mode noise than a normal mode noise. The common-mode noise is generated mainly due to electrostatic capacity between primary and secondary transformers. Thus, in addition to reducing the electrostatic capacity, it is more preferable to employ a system with voltage-resonances for the entire period so that the voltage waveform becomes close to a waveform with less high harmonic wave, i.e. a sine wave.

The second requirement is associated with the response. If 1 kHz enters to a class B audio amplifier, 1000 times load changes per second are caused. As an example of bad response ringing in repeated load changes of 0% and 100% may be generated. Moreover, the ringing generated is of about 2 kHz which sounds offensive to the ears. The generated ringing oscillates an amplifier power supply terminal, thereby receiving a bad influence through the SVRR (supply voltage rejection ratio) of the amplifier thus producing a peculiar echo. Actually, when a power IC for a car audio system is driven by a switching power supply for a notebook PC that has no consideration over the response, "echo that may be caused by ringing" often occurs.

Therefore, for controlling, it is preferable to control to achieve either an extremely high-speed response or a slow response by providing a large smoothing capacitor to output for absorbing rapid music change. That is, it is preferable to bring it to the frequency change having less influence upon the sense of hearing.

The third requirement is to be able to correspond to instant peak current even of a small size. Not only the response but also the instantaneousness is very important for audio equipments in order for it to follow music signals (specifically, percussion instrument sounds), which change instantly and momentarily, since the peak current is extremely large with respect to the average current in the music signals.

The primary inductor of the resonance-type Royer converter has a direct current component flown in so that it is necessary to have a large gap for not causing magnetic saturation, which results in reduction of inductance. However, without having a large inductance, rms (root mean square value) current of the primary inductor, switch, and rectifier is increased, thereby reducing the efficiency. If the number of winding turns is increased, however, copper loss is increased. As a result, it requires still larger core size. Even with this, an extremely large rush current flows at the time of supplying power, and if the core is saturated, still larger overcurrent is flown, which may break the switching element.

When the overcurrent flows and OCP (Over Current Protection) is actuated, the switch is OFF. One of the alternately-switched switches is OFF so that two switches become OFF simultaneously. Upon this, the electric current of the inductor has nowhere to be flown, thus excessively increasing the voltage on the output side. This allows application of overcurrent to the switching element that may be broken thereby.

Furthermore, manufacturers of electrolytic capacitors have introduced high sound-quality electrolytic capacitors on the market. However, unlike those for switching-use, they do not necessarily have less resistance component under the switching frequency. Therefore, when selecting a capacitor for an audio of one's favorite sound quality, it can not be selected at will since there is a restriction to have a good high-frequency property in the case of using a general switching power supply.

MEANS FOR SOLVING THE OBJECT

The present invention has paid an attention to advantages of the resonance-type Royer converter that it has less switching noise and requires no high-side driver, and provides an improvement to be used for audio apparatuses based thereupon. FIG. 1 is a basic circuit of the resonance-type Royer converter.

Conventionally, it has been understood that it is possible to perceive only up to 20 kHz aurally, and the sampling frequencies of CD and BS are determined as 44.1 kHz and 48 kHz based thereupon. However, audio maniacs have continued to claim that the sound is bad, which has encouraged further study of auditory sense. According to the latest report, it has been recognized that there is an acoustic influence on human beings up to about 90 kHz in terms of music. As a result, there have been introduced SACD and DVD audios, which can perform reproduction up to about 90 kHz.

In view of the above, it is preferable in the present invention to have less noise as the switching power supply for audio and, at the same time, if there is, it is preferable for the noise to be about 90 kHz or more for not influencing the auditory sense. The target herein is set as 88 kHz or more to be twice or more of the sampling frequency of CD. There is a restriction in EMI noise standard on the noise of 150 kHZ or more. As a result, the switching frequency is preferable to be within the range of 88 kHz-150 kHz.

Further, the resonance-type Royer converter is preferable since it has constant voltage property in the output voltage itself even without control. Therefore, there is no unstable factor for the response substantially even when used without control. Most of the switching power supplies have phase-delay element of secondary or higher so that there includes substantially unstable factors when controlled.

A first aspect of the present invention is a switching power supply apparatus, which comprises: an direct current power source; a first inductor whose one end is connected to the direct current power source; and a transformer with a center tap provided to a primary winding, the center tap being connected to other end of the first inductor, wherein both ends of the primary winding of the transformer are respectively connected to a first switching element and a second switching element, which are alternately switched, and a secondary winding of the transformer is smoothed by a smoothing means via a rectifier circuit, wherein a second inductor is inserted between the rectifier circuit and the smoothing means, and the first inductor and the second inductor are coupled in the same magnetic circuit in a direction of canceling a direct current magnetic flux.

By connecting each in this manner for canceling the direct current magnetic flux, the gap of the inductor can be eliminated, which enables to have a large inductance even with a small number of turns. Thus, the electric current flowing in the switching element becomes close to a square wave thus reducing the rms (root mean square value) current, which results is reduction of the loss. Two square waves are alternately added in the smoothing means so that influence of equivalent series resistance (ESR) and equivalent series inductance (ESL) becomes less as getting close to a direct current. When the output current becomes close to a direct current, the input comes close to a direct current as well, resulting in reduction of noise as a whole.

Manufactures of electrolytic capacitors have introduced electrolytic condensers for high sound-quality on the market. However, switching-use thereof is different and the resistance component in the switching frequency is not necessarily reduced. With the system of the present invention, however, the output current has continuity and is close to the direct current so that there faces only a small loss even if there is a resistant component in the switching frequency. Therefore, it is possible to select a capacitor for an audio with a favorite sound quality without a restriction to have a good high-frequency property.

A second aspect of the present invention is a switching power supply apparatus, which comprises: an direct current power source; a first inductor whose one end connected to the direct current power source; and a transformer with a center tap provided to a primary winding, the center tap being connected to other end of the first inductor, wherein both ends of the primary winding of the transformer are respectively connected to a first switching element and a second switching element, which are alternately switched, and a secondary winding of the transformer is connected to an alternating current load, wherein: a rectifier and a second inductor are provided between the second winding of the transformer and the alternating current load, the second inductor being connected in such a manner that a rectified electric current of one direction flows in the second inductor; and the first inductor and the second inductor are coupled in a same magnetic circuit in a direction of canceling a direct current magnetic flux.

A third aspect of the present invention is a switching power supply apparatus, wherein a ratio of the number of the primary windings of the transformer to that of the secondary windings is set equal to a ratio of the number of windings of the first inductor to that of windings of the second inductor for more strictly canceling the direct current magnetic flux.

By setting the ratios of the winding numbers in this manner, logically, the load current is increased in both the transformer and a coupling choke, thus causing no magnetic saturation. That is, there is no saturation of core at the time of power supply and at a peak of music so that a large instantaneous power can be attained.

A fourth aspect of the present invention is a switching power supply apparatus, which comprises: an direct current power source; an inductor whose one end connected to the direct current power source; and a transformer with a center tap provided to a primary winding, the center tap being connected to other end of the inductor, wherein both ends of the primary winding of the transformer are respectively connected to a first switching element and a second switching element, which are alternately switched, wherein: additional winding and diode are provided to the inductor to be connected such that an energy accumulated in the inductor is recovered to a power supply for restricting a voltage increase in the other end of the inductor, so that there is no excessive increase of the voltage in the other end of the inductor when the first switching element and the second switching element become OFF simultaneously.

It is devised so that the switching element is not broken down by overvoltage applied when OCP is actuated.

A fifth aspect of the present invention is a switching power supply apparatus, which comprises: an direct current power source; an inductor whose one end connected to the direct current power source; and a transformer with a center tap provided to a primary winding, the center tap being connected to other end of the inductor, wherein both ends of the primary winding of the transformer are respectively connected to a first switching element and a second switching element, which are alternately switched, and a secondary winding of the transformer is smoothed by a smoothing means via a rectifier circuit or directly supplied to an alternating current load, wherein: the first and second switching elements are driven by using a control IC with a synchronous signal input terminal or a terminal for determining an oscillation frequency; and either a center tap voltage of the transformer or a rectified voltage of a tertiary winding that is provided to the transformer is applied to the synchronous signal input terminal of the control IC or the terminal for determining the oscillation frequency in order to determine ON-timing of next cycle for actually starting self-excited oscillating action.

Moreover, it is necessary when used for audios to reduce the switching noise as much as possible. Due to the reasons described later, it is desirable to be from 88 kHz-150 kHz inclusive even if there is.

With such high frequency, it is difficult to have high performance unless with FET. Further, in order to avoid breakdown of the switching elements in case of using FET, when the elements are simultaneously ON at the time of start-up, the present invention uses a separately excited IC for driving at an optimum timing, and aims at achieving high efficiency at 88 kHz-150 kHz inclusive. When a general-purpose IC is used fro driving the switching element, it is started with hysteresis property, which provides some advantages, e.g. the state of startup becomes stable, OCP is easy, etc.

A sixth aspect of the present invention is the switching power supply apparatus according to the fifth aspect of the present invention, wherein a comparator is used for shaping a waveform of either the center tap voltage of the transformer or the rectified voltage of the tertiary winding.

A seventh aspect of the present invention is the switching power supply apparatus according to the sixth aspect of the present invention, wherein the comparator uses PNP or PchFET to compare the center tap voltage of the transformer or the rectified voltage of the tertiary winding and the voltage as a result of rectifying and smoothing the voltage of the tertiary winding or a reference voltage. By using PNP or PchFET as the comparator, a high-speed comparator can be constituted easily and stably at a low cost.

An eighth aspect of the present invention is the switching power supply apparatus according to any one of the fifth-seventh aspects of the present invention, wherein an output signal of the comparator is differentiated to be applied to the synchronous signal input terminal or the terminal for determining the oscillation frequency.

Accurate operations of the synchronous signal input terminal for a general-purpose IC or the terminal for determining the oscillation frequency in the next cycle cannot be expected unless they are in the low levels. Therefore, a differentiating function is used for easily bringing them to low levels before going to the next cycle.

A ninth aspect of the present invention is the switching power supply apparatus according to any one of the fifth-eighth aspects of the present invention, wherein, there is inserted, in the direction fro extending ON-time, a unit comprising a diode and a resistance in parallel-connection between the control IC and the switching element for adjusting a driving time, or a unit comprising a transistor and a resistance in parallel-connection.

It is necessary to adjust the duty ratio to be 50% in order for the resonance-type Royer converter to operate in an optimum manner. However, the maximum duty ratio of the general-purpose IC suited for the present invention is 49%, so that the ON-time needs to be extended a little longer.

A tenth aspect of the present invention is the switching power supply apparatus according to any one of the first-ninth aspects of the present invention, wherein an operation frequency is set from 88 kHz-150 kHz inclusive.

An eleventh aspect of the present invention is audio equipment, which comprises the switching power supply apparatus according to any one of the first-tenth aspects of the present invention used therein.

EFFECT OF THE INVENTION

The present invention has less switching noise, simple response, and instantaneousness without having saturation of the magnetic core, so that is most suitable to be used for audios. Moreover, it requires no high-side driver and is low at cost, which enables to constitute a power supply apparatus that is most suitable for consumer appliances.

BEST MODE FOR PERFOMING THE INVENTION

Figure 1:
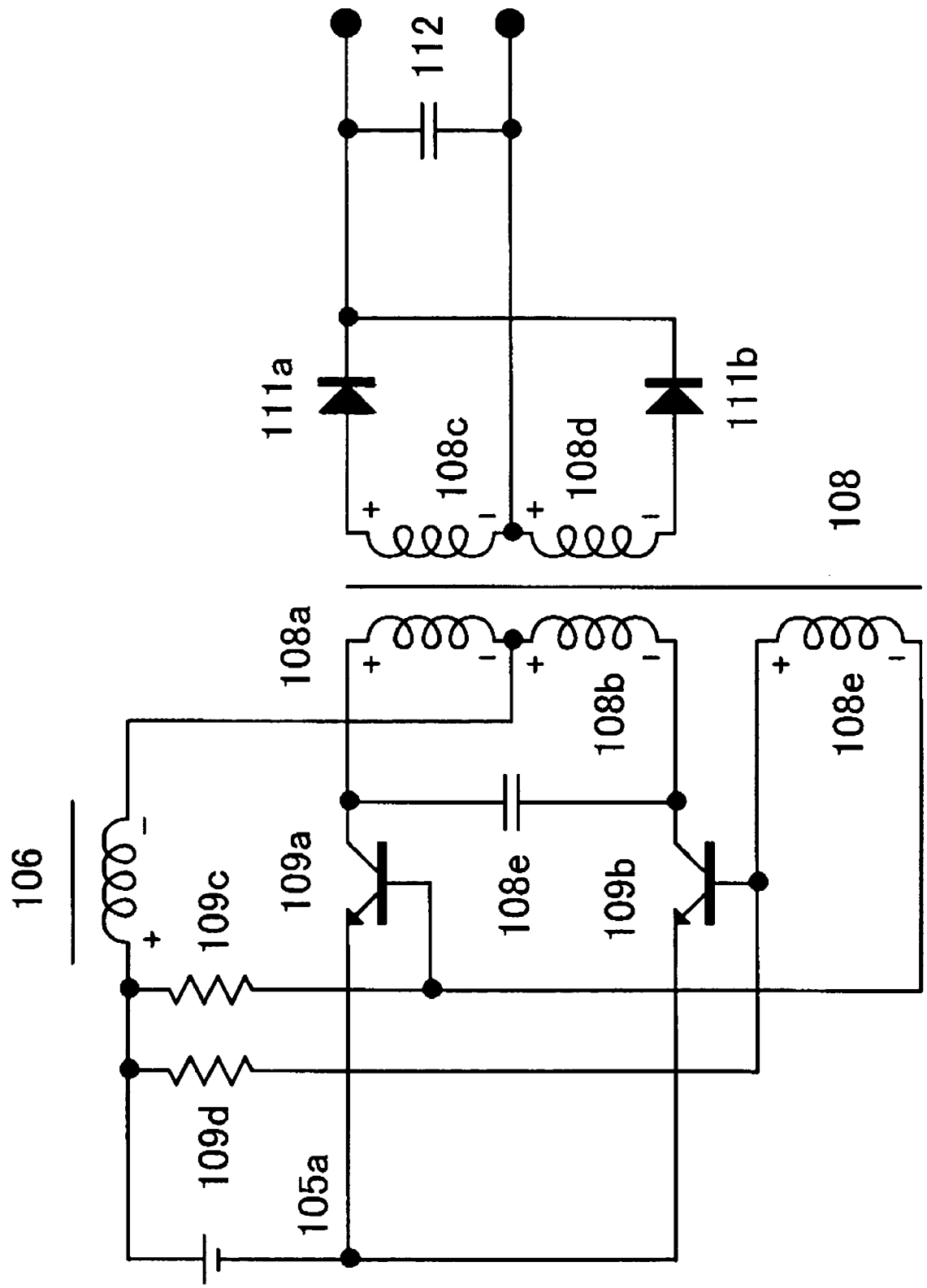
FIG. 1 is a basic circuit block diagram of a conventional resonance-type Royer converter.
Figure 2:
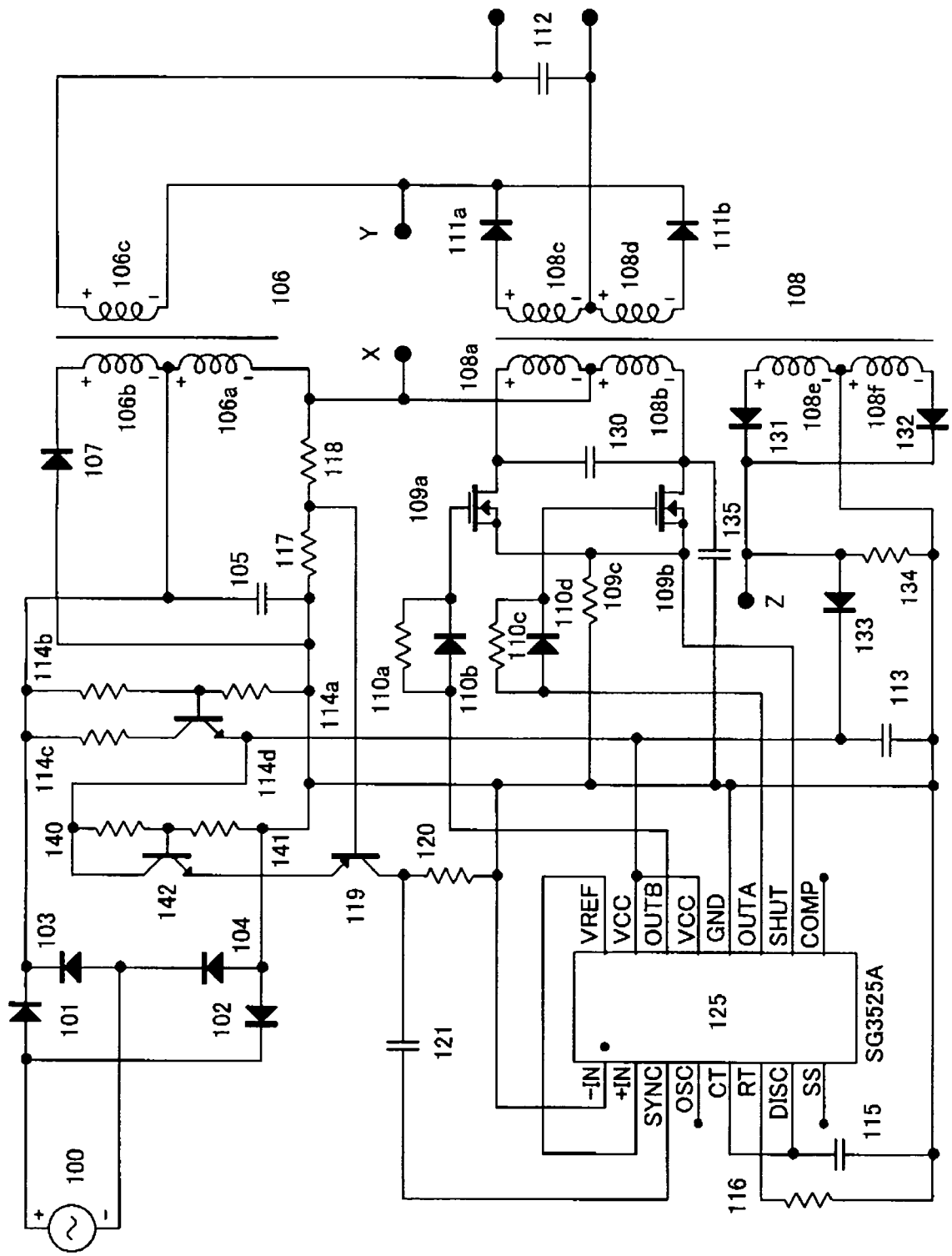
FIG. 2 is a circuit block diagram for showing a first embodiment of a power supply apparatus of the present invention.

Referring to FIG. 2, an alternating current power source 100 is rectified by rectifiers 101-104 and smoothed by a smoothing capacitor 105 to be a direct current power source. This direct current power source is supplied to a center tap that is an intersection of primary windings 108a and 108b of a transformer 108 via a winding 106a of a coupling inductor 106. Both ends of the primary windings 108a and 108b are connected to a resonance capacitor 130 while being connected to two switching elements 109a and 109b. This resonance capacitor may be disposed on either the primary side or the secondary side, or may be separated on both sides.

Two switching elements alternately perform switching action so as to be in ZVS operation, so that the voltage waveform has a half-wave of an extremely fine sine-wave. 109c is a resistance for detecting overcurrent. An electric current flown to secondary windings 108c and 108d of the transformer is rectified by rectifiers 111a and 111b, which is outputted after being smoothed by a smoothing capacitor 112 via a winding 106c of the coupling inductor 106. On assumption to be easily understood that the numbers of turns of the windings 108a, 108b, 108c, 108d and those of the windings 106a, 106c of the coupling inductor 106 are all the same and that there provides an idealistic operation, the voltage waveforms at X-point and Y-point are in perfect match. Thus, actions on the primary and secondary sides become symmetrical.

It is very important to note that the core is not saturated even if a large inrush current flows at the time of power supply since alternating current magnetic fluxes of the windings 106a and 106c are in the direction of adding and the direct current magnetic fluxes thereof are in the direction of canceling. Therefore, there is no gap necessary for the coupling inductor 106, which allows a large inductance to be attained even with a small number of windings for suppressing the copper loss. When the inductance of the coupling inductor 106 is increased, the electric current flowing therein becomes close to a constant current so that the electric current flown in the switching elements 109a and 109b becomes close to a square wave. This enables to suppress an increase in the rms (root mean square value) current, thus reducing the loss. When the inductor of the coupling inductor 106 is small, an electric current with the component of twice the switching frequency overlaps with the electric current flown in the switching elements 109a and 109b, which increases the rms (root mean square value) current, resulting in an increase of the loss.

The winding 106b of the coupling inductor 106 and a diode 107 are provided for avoiding breakdown of the switching elements 109a and 109b due to excessive increase of potential at X-point under an abnormal circumstance where the overcurrent protection circuits of the switching elements 109a and 109b are actuated and the both elements become OFF simultaneously.

A control circuit by referring to the case where a control IC is SG3525A will be described. The structure is as follows. Resistances 114a-114c and a transistor 114d are starting circuits. When the voltage of a capacitor 113 increases and the control IC is started, the electric current of windings 108e and 108f (tertiary windings) of a transformer 108 are supplied to the capacitor 113 via diodes 131, 132 and 133. Upon reaching a normal voltage, the starting current decreases radically. A resistance 134 adjusts the voltage waveform at Z-point described later.

A resistance 116 and a capacitor 115 provide oscillation by slightly lower frequency than that of the normal operation for starting-up.

After starting-up, a comparator constituted with a transistor 119 and a resistance 120 as a load resistance compares the potential (X-point) at the intersection of the primary windings 108a and 108b of the transformer 108 divided by resistances 117, 118, and the rectified and smoothened voltage of the tertiary winding, i.e. the VCC voltage of the control IC 125, which is divided by resistances 140, 141 and then goes through the transistor 142. The result is differentiated by the capacitor 121 to be applied to synchronous input of the control IC 125. The waveforms at X-point and Z-point are the same so that X-point can be used instead.

Differentiation is necessary for decreasing the level of a synchronous signal by a next ON-signal. By switching to a next cycle through the synchronous signal, it is possible to have a more accurate ZVS action than that of self-excited oscillation even with separately-exited oscillation. The resistance inserted to the gates of the switching elements 109a, 109b and the capacitors 110a-110d are apparatus for slightly extending the ON-time. This is used for correcting a narrow simultaneous-OFF period generated with the SG3525A as the control IC125 since it has a duty ratio of 49% at the maximum. It may be substituted with a circuit where the diode is replaced with a transistor. The diode faces the opposite direction from that of a typical circuit which is inserted for reducing the noise.

At an actual winding of a transformer, the windings with the same number of turns do not necessarily produce the same inductances if the numbers of layers of the windings 108a and 108b are different. A capacitor 135 is an apparatus for making the resonance states symmetrical even in such case. Symmetrical resonances allow less voltage increase at the time of light load, which improves regulation thus providing a good sound quality.

Figure 3:
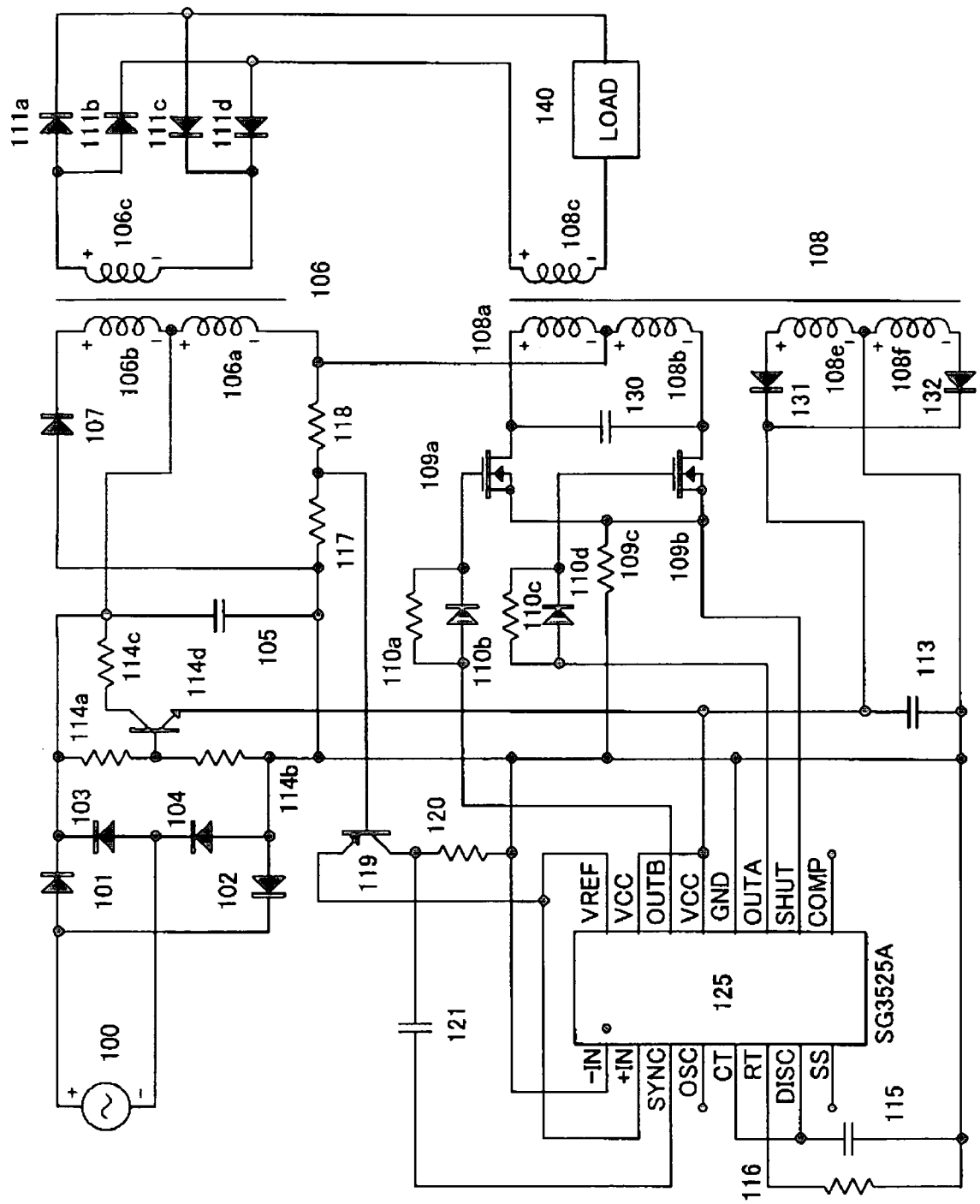
FIG. 3 is a circuit block diagram for showing a second embodiment of a power supply apparatus of the present invention.

FIG. 3 is an example of a circuit when supplying an electric current to a load such as a lighting apparatus, which is not converted to direct current, wherein mainly the secondary side of the circuit shown in FIG. 2 is modified. The voltage generated in the winding 108c of the transformer 108 is bridge-rectified by diodes 111a-111d and the electric current flows in the winding 106c of the coupling inductor 106 in the same direction. With this structure, the magnetic flux generated by the electric current flowing in the winding 106a is cancelled. An emitter Vref of a transistor 119 is connected to 5V for simplifying the circuit.

DESCRIPTION OF THE REFERENCE NUMERALS

100: alternating current power source
105a: direct current power source
109c, 109d, 110a, 110c, 114a, 114b, 114c, 116, 117, 118, 120, 134, 140, 141: resistance
106: inductor
108: transformer
106a, 106b, 106c, 108a, 108b, 108c, 108d, 108e, 108f: winding
101, 102, 103, 104, 107, 110b, 110d, 111a, 111b, 111c, 111d, 131, 132, 133: diode
105, 108e, 112, 113, 115, 121, 130, 135: capacitor
109a, 109b: switch
114d, 119, 142: transistor
125: control IC
140: AC load

What is claimed is:

1. A switching power supply apparatus, comprising: an direct current power source; a first inductor whose one end connected to the direct current power source; and a transformer with a center tap provided to a primary winding, the center tap being connected to other end of the first inductor, wherein both ends of the primary winding of the transformer are respectively connected to a first switching element and a second switching element, which are alternately switched, and a secondary winding of the transformer is smoothed by a smoothing means via a rectifier circuit, wherein
a second inductor is inserted between the rectifier circuit and smoothing means, and the first inductor and the second inductor are coupled in a same magnetic circuit in a direction of canceling a direct current magnetic flux.

2. The switching power supply apparatus according to claim 1, wherein a ratio of number of the primary windings of the transformer to that of the secondary windings is set equal to a ratio of number of windings of the first inductor to that of windings of the second inductor for more strictly canceling the direct current magnetic flux.

3. The switching power supply apparatus according to claim 1, wherein an operation frequency is set from 88 kHz or more and to 150 kHz inclusive.

4. A switching power supply apparatus, comprising: an direct current power source; a first inductor whose one end is connected to the direct current power source; and a transformer with a center tap provided to a primary winding, the center tap being connected to other end of the first inductor, wherein both ends of the primary winding of the transformer are respectively connected to a first switching element and a second switching element, which are alternately switched, and a secondary winding of the transformer is connected to an alternating current, wherein:
a rectifier and a second inductor are provided between the second winding of the transformer and the alternating current load, the second inductor being connected in such a manner that a rectified electric current of one direction flows in the second inductor; and the first inductor and the second inductor are coupled in a same magnetic circuit in a direction of canceling a direct current magnetic flux.

5. The switching power supply apparatus according to claim 4, wherein an operation frequency is set from 88 kHz or more and to 150 kHz inclusive.

6. The switching power supply apparatus according to claim 4, wherein a ratio of number of the primary windings of the transformer to that of the secondary windings is set equal to a ratio of number of windings of the first inductor to that of windings of the second inductor for more strictly canceling the direct current magnetic flux.

7. A switching power supply apparatus, comprising: an direct current power source; an inductor whose one end connected to the direct current power source; and a transformer with a center tap provided to a primary winding, the center tap being connected to other end of the inductor, wherein both ends of the primary winding of the transformer are respectively connected to a first switching element and a second switching element, which are alternately switched, wherein:

an additional winding and diode are provided to the inductor to be connected such that an energy accumulated in the inductor is brought back to a power supply for restricting a voltage increase in the other end of the inductor, so that there is no excessive increase of the voltage in the other end of the inductor when the first switching element and the second switching element become OFF simultaneously.

8. The switching power supply apparatus according to claim 7, wherein an operation frequency is set from 88 kHz or more and to 150 kHz inclusive.

9. A switching power supply apparatus, comprising: an direct current power source; an inductor whose one end is connected to the direct current power source; and a transformer with a center tap provided to a primary winding, the center tap being connected to other end of the inductor, wherein both ends of the primary winding of the transformer are respectively connected to a first switching element and a second switching element, which are alternately switched, and a secondary winding of the transformer is smoothed by a smoothing means via a rectifier circuit or directly supplied to an alternating current load, wherein:

the first and second switching elements are driven by using a control IC with a synchronous signal input terminal or a terminal for determining an oscillation frequency; and either a center tap voltage of the transformer or a rectified voltage of a tertiary winding that is provided to the transformer is applied to the synchronous signal input terminal of the control IC or the terminal for determining the oscillation frequency in order to determine ON-timing of next cycle for actually starting self-excited oscillating action.

10. The switching power supply apparatus according to claim 9, wherein a comparator is used for shaping a waveform of either the center tap voltage of the transformer or the rectified voltage of the tertiary winding.

11. The switching power supply apparatus according to claim 10, wherein the comparator uses PNP or PcnFET to compare the center tap voltage of the transformer or the rectified voltage of the tertiary winding and the voltage as a result of rectifying and smoothing the voltage of the tertiary winding or a reference voltage.

12. The switching power supply apparatus according to claim 9, wherein an output signal of the comparator is differentiated to be applied to the synchronous signal input terminal or the terminal for determining the oscillation frequency.

13. The switching power supply apparatus according to claim 9, wherein, there is inserted, in the direction for extending ON-time, a unit having a diode and a resistance in parallel-connection between the control IC and the switching element for adjusting a driving time, or a unit having a transistor and a resistance in parallel-connection.

14. The switching power supply apparatus according to claim 9, wherein an operation frequency is set from 88 kHz or more and to 150 kHz inclusive.

15. Audio equipment comprising a switching power supply apparatus chosen from the group consisting of:

(a) A switching power supply apparatus, comprising: an direct current power source: a first inductor whose one end connected to the direct current power source: and a transformer with a center tap provided to a primary winding, the center tap being connected to other end of the first inductor, wherein both ends of the primary winding of the transformer are respectively connected to a first switching element and a second switching element, which are alternately switched, and a secondary winding of the transformer is smoothed by a smoothing means via a rectifier circuit, wherein a second inductor is inserted between the rectifier circuit and smoothing means, and the first inductor and the second inductor are coupled in a same magnetic circuit in a direction of canceling a direct current magnetic flux;

(b) A switching power supply apparatus, comprising: an direct current power source; a first inductor, whose one end is connected to the direct current power source; and a transformer with a center tap provided to a primary winding, the center tap being connected to other end of the first inductor, wherein both ends of the primary winding of the transformer are respectively connected to a first switching element and a second switching element, which are alternately switched, and a secondary winding of the transformer is connected to an alternating current, wherein:

a rectifier and a second inductor are provided between the second winding of the transformer and the alternating current load, the second inductor being connected in such a manner that a rectified electric current of one direction flows in the second inductor; and the first inductor and the second inductor are coupled in a same magnetic circuit in a direction of canceling a direct current magnetic flux;

(c) A switching power supply apparatus, comprising: an direct current power source; an inductor whose one end connected to the direct current power source; and a transformer with a center tap provided to a primary winding, the center tap being connected to other end of the inductor, wherein both ends of the primary winding of the transformer are respectively connected to a first switching element and a second switching element, which are alternately switched, wherein:

an additional winding and diode are provided to the inductor to be connected such that an energy accumulated in the inductor is brought back to a power supply for restricting a voltage increase in the other end of the inductor, so that there is no excessive increase of the voltage in the other end of the inductor when the first switching element and the second switching element become OFF simultaneously; and (d) A switching power supply apparatus, comprising: an direct current power source; an inductor whose one end is connected to the direct current power source; and a transformer with a center tap provided to a primary winding, the center tap being connected to other end of the inductor, wherein both ends of the primary winding of the transformer are respectively connected to a first switching element and a second switching element, which are alternately switched, and a secondary winding of the transformer is smoothed by a smoothing means via a rectifier circuit or directly supplied to an alternating current load, wherein:

the first and second switching elements are driven by using a control IC with a synchronous signal input terminal or a terminal for determining an oscillation frequency; and either a center tap voltage of the transformer or a rectified voltage of a tertiary winding that is provided to the transformer is applied to the synchronous signal input terminal of the control IC or the terminal for determining the oscillation frequency in order to determine ON-timing of next cycle for actually starting self-excited oscillating action.

* * * * *